(12) United States Patent
Reinart et al.

(10) Patent No.: US 8,195,939 B2
(45) Date of Patent: Jun. 5, 2012

(54) SYSTEMS AND METHODS FOR PROTECTING SENSITIVE DATA

(75) Inventors: Manfred Reinart, Germersheim (DE); Jan-Erik Steltz, Rostock (DE)

(73) Assignee: SAP AG, Walldorf (DE)

( * ) Notice: Subject to any disclaimer, the term of this patent is extended or adjusted under 35 U.S.C. 154(b) by 1223 days.

(21) Appl. No.: 11/652,535

(22) Filed: Jan. 12, 2007

(65) Prior Publication Data
US 2008/0172745 A1 Jul. 17, 2008

(51) Int. Cl.
*H04L 9/32* (2006.01)
(52) U.S. Cl. .................................................. 713/166
(58) Field of Classification Search .................. 713/166
See application file for complete search history.

(56) References Cited

U.S. PATENT DOCUMENTS

| | | | |
|---|---|---|---|
| 5,996,011 A | 11/1999 | Humes | |
| 6,078,907 A | 6/2000 | Lamm | |
| 6,363,178 B1 | 3/2002 | Chiba et al. | |
| 6,424,971 B1 | 7/2002 | Kreulen et al. | |
| 6,553,498 B1 | 4/2003 | Elgressy et al. | |
| 6,668,102 B2 | 12/2003 | Chiba et al. | |
| 6,889,205 B1 | 5/2005 | Lamm | |
| 7,103,915 B2 | 9/2006 | Redlich et al. | |
| 2003/0001893 A1* | 1/2003 | Haley | 345/762 |
| 2003/0196108 A1* | 10/2003 | Kung | 713/200 |

OTHER PUBLICATIONS

Hiroshi Maruyama and Takeshi Imamura, Element-Wise XML Encryption, Apr. 19, 2000, 5 pages, downloaded from Internet website: http://lists.w3.org/Archives/Public/xml-encryption/2000Apr/att-0005/01-xmlenc11/16/2006 on Nov. 11, 2006.

* cited by examiner

*Primary Examiner* — Jacob Lipman
(74) *Attorney, Agent, or Firm* — Finnegan, Henderson, Farabow, Garrett & Dunner, LLP

(57) ABSTRACT

Methods and systems are disclosed for protecting sensitive data. In one implementation, a message is received that includes a plurality of information elements, at least one of the plurality of information elements having message information and belonging to at least one of a plurality of predefined classes of information elements. At least one of the plurality of information elements may be selected that belongs to a predefined class corresponding to a target class, the target class including classes of information elements selected for removal. Further, any message information corresponding to the selected information elements may be removed to protect sensitive data.

20 Claims, 7 Drawing Sheets

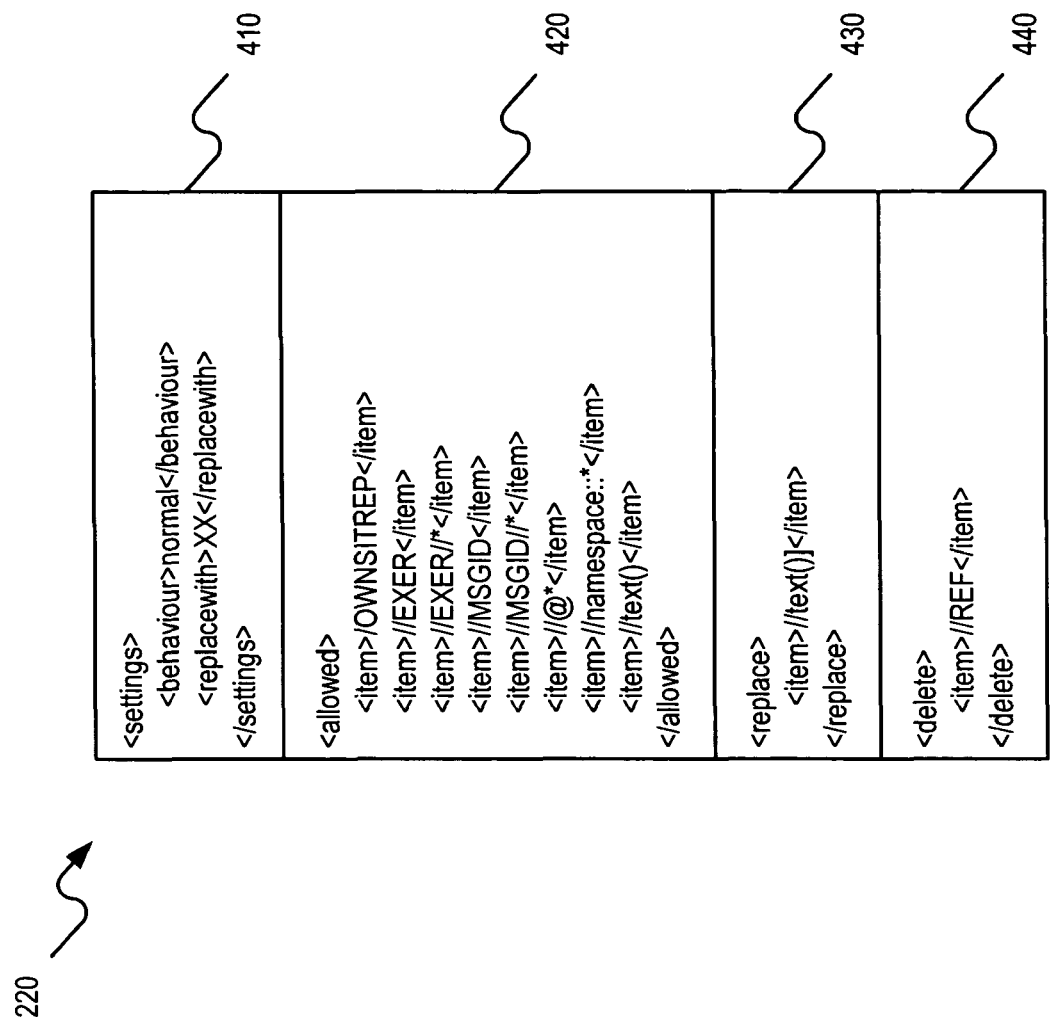

SYSTEMS AND METHODS FOR PROTECTING SENSITIVE DATA

TECHNICAL FIELD

The present invention generally relates to the field of data security. More specifically, and without limitation, the invention relates to systems and methods for protecting sensitive data.

BACKGROUND INFORMATION

Data security is a great concern for organizations and individuals. Although there are many ways to protect information within a particular system or environment, the information is placed at risk of interception or theft whenever it is communicated to a less secure system or environment. To prevent sensitive information from being stolen, security requirements may forbid its transmission over insecure channels or to a less secure system. But, because systems are commonly operated at different security levels, the communication of information between systems having different security levels is often unavoidable. For instance, a network's infrastructural limitations may require that information be transmitted between systems over insecure (e.g., encrypted) communication channels. Alternatively, an insecure system (e.g., a business resource planning system) may rely on information provided by a secure system (e.g., a classified system).

In many cases, however, only a portion of the information included in a communication is sensitive and the insecure system that receives the communication may not even require this portion. Thus, the sensitive portions may be removed before the information is communicated with little or not impact on the recipient. For example, a classified military command and control information system ("C2IS") supporting ongoing military operations may exchange information with a relatively insecure information system providing logistical support. The logistical system may require only enough information to track quantities of supplies and materials required by the operations, without needing specific operational details that are highly classified.

In some prior solutions, a person responsible for communicating a message including classified information to a recipient at an insecure location was required to create a new message by manually copying the unclassified portions into an empty message template. This redacted version of the original message was permitted to be transmitted to the recipient. Such solutions, however, are obviously time-consuming and prone to human error.

Another prior approach uses extensible stylesheets language ("XSL") that define the content and structure of extensible markup language ("XML") messages. Using a predefined XSL file, a message may be transformed into a new message that includes only the unclassified parts of an original, classified XML message. However, because the use of XSL files are limited to XML documents having similar structure, this approach restricts the variety of XML documents that may be processed. If several different XML files with different structures are to be processed, different XSL files must be written corresponding to each structure and, at a later time, the appropriate XSL file must be determined to process the corresponding XML message. Furthermore, the creation and development of such XSL files is very time consuming and requires in-depth knowledge of the XSL programming language.

SUMMARY OF THE INVENTION

Consistent with embodiments of the present invention, systems and methods are disclosed that can provide improved data security. Embodiments of the invention include systems and methods for protecting sensitive data, including data crossing borders of various security domains. As disclosed herein, such embodiments may be computerized or software enabled.

Consistent with an embodiment of the invention, a method is provided for removing selected information from a message. The method includes receiving a message including a plurality of information elements, at least one of the plurality of information elements having message information and belonging to at least one of a plurality of predefined classes of information elements. Further, the method includes selecting any of the plurality of information elements belonging to a predefined class corresponding to a target class, the target class including classes of information elements selected for removal, and removing the message information corresponding to the selected information elements.

Consistent with another embodiment of the invention, a system is provided for removing information from a message. The system includes a processor and a computer-readable medium coupled to the processor, wherein a program stored in the computer-readable medium. The program, when executed by the processor, is operable to receive a message including a plurality of information elements, at least one of the plurality of information elements having message information and belonging to at least one of a plurality of predefined classes of information elements. The program is also operable to select any of the plurality of information elements belonging to a predefined class corresponding to a target class, the target class including classes of information elements selected for removal. Moreover, the program is operable to remove any message information corresponding to the selected information elements.

Embodiments of the invention further relate to a method for removing confidential information from a message. In one embodiment, the method includes receiving a confidential message including a plurality of information elements, at least one of the plurality of information element having message information and belonging to at least one of a plurality of predefined classes of information elements. The method further includes receiving configuration data indicating a class of information elements for removal from the message and indicating a class of information elements for retention in the message, the class of information for removal including confidential message information. Additionally, the method includes selecting information elements belonging to the class indicated for removal and removing any message information corresponding to the selected information elements.

Both the foregoing general descriptions and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate exemplary embodiments and various aspects of the present invention. In the drawings:

FIG. 4 is a diagram of an exemplary configuration file, consistent with an embodiment of the present invention.

DETAILED DESCRIPTION

The following detailed description of embodiments of the present invention refers to the accompanying drawings. Where appropriate, the same reference numbers in different drawings refer to the same or similar elements.

Figure 1:
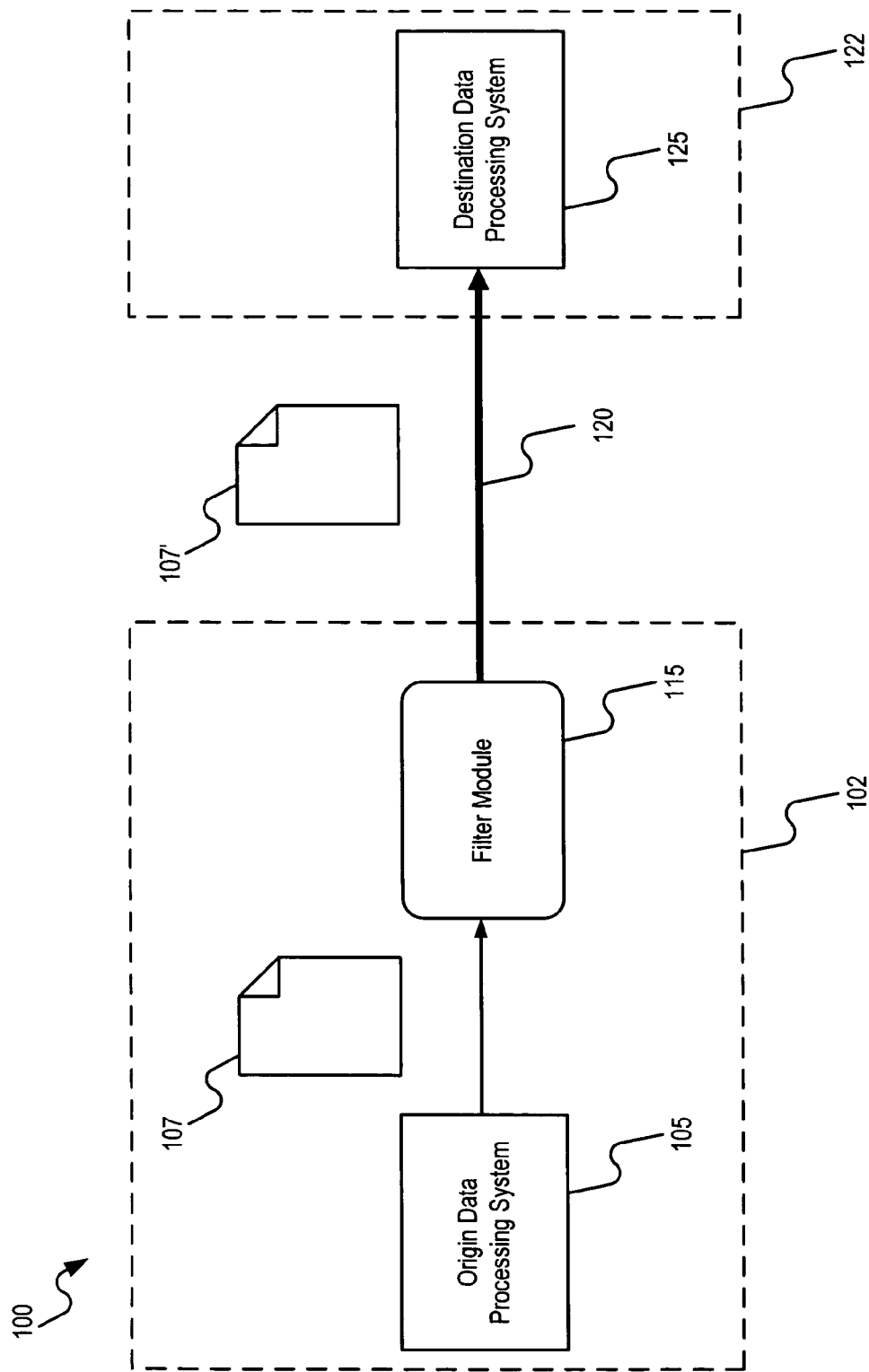
FIG. 1 is a diagram of an exemplary system, consistent with an embodiment of the present invention.

FIG. 1 shows a diagram of exemplary system 100, consistent with an embodiment of the present invention. As shown in FIG. 1, system 100 includes a secure environment 102 with an origin data processing system 105 and a filter module 115; and an insecure environment 122 with a destination data processing system 125. As further described below, a file or message 107 may be filtered by filter module 115 to provide a filtered file or message 107' that is sent via a communication channel 120 to destination data processing system 125.

Origin data processing system 105 may include one or more data processing devices operable, at least in part, to provide or generate message 107. Origin data processing system 105 includes, for example, one or more handheld computers, personal computers, minicomputers, workstations, mainframes or any other conventional computing platform and combinations thereof. Furthermore, origin data processing device 105 may include additional components, peripherals, and/or user interface devices typical of such computing platforms.

In some embodiments, origin data processing system 105 may include a closed network of computers that are physically and/or functionally isolated to provide limited access to systems or individuals outside the network. For instance, origin data processing system 105 may be a business' password-protected local area network having a server linked to the Internet through a firewall. Alternatively, system 105 may be a classified military command and control network that has few, if any, datalinks to networks or external to the system. Such a network may comprise one or more command and control information systems (C2ISs), for example.

For the purposes of the exemplary embodiment, origin data processing system 105 may provide or generate message 107, including sensitive information that is processed by filter module 115 to provide a filtered message 107' to destination data processing system 125. Of course, origin data processing system 105 may have any purpose or function, only one of which includes the provision or generation of message 107, and this example should not be considered to limit the scope of data processing system 105.

Sensitive information may be any classified, proprietary, confidential, financial, or personal information. For example, sensitive information may be data classified as secret by a government, military, or other such organization. Sensitive information may also be private information such an individual's personal, financial, or health information. Sensitive information also may be any other data a user may desire to remove from a message, such as age-restricted content that is not appropriate for receipt outside of secure environment 102.

Message 107 may be any file, document, message, or record. For instance, message 107 may be an electronic mail, facsimile message, simple-message service ("SMS") message or multimedia message service ("MMS") message. Message 107 may comprise a document such as a letter, text file, a database record, spreadsheet, or data file. Information in message 107 is not limited to text and also may include other content such as sound, video, pictures, or other audio-visual information. In some embodiments, message 107 includes data for an enterprise resource planning (ERP) system that is part of destination data processing system 125, for example. Also, in some embodiments, message 107 is encoded in an XML format.

Filter module 115 may be a module or program comprising executable instructions operable to receive message 107 from data processing system 105 and remove sensitive information to generate filtered message 107' for communication to destination data processing system 125. Filter module 115, in one embodiment, is a stand-alone application executed on a processor within data processing system 105. Alternatively, filter module 115 may be executed by a separate data processing device or processor that is connected to data processing system 105. For instance, filter module 115 may be executed by a gateway server that all messages transmitted by origin data processing system 105 must pass through before transmission over communication channel 120 to destination data processing system 125.

Communications channel 120 may be any channel used for the communication of messages between origin data processing system 105 and destination data processing system 125. Communications channel 120 may be a shared, public, private, or peer-to-peer network, encompassing any wide or local area network, such as an extranet, an intranet, the Internet, a Local Area Network (LAN), a Wide Area Network (WAN), a public switched telephone network (PSTN), an Integrated Services Digital Network (ISDN), radio links, a cable television network, a satellite television network, a terrestrial wireless network, or any other form of wired or wireless communication networks.

Further, communications channel 120 may be compatible with any type of communications protocol used by the components of system environment 100 to exchange data, such as the Ethernet protocol, ATM protocol, Transmission Control/Internet Protocol (TCP/IP), Hypertext Transfer Protocol (HTTP), Hypertext Transfer Protocol Secure (HTTPS), Real-time Transport Protocol (RTP), Real Time Streaming Protocol (RTSP), Global System for Mobile Communication (GSM) and Code Division Multiple Access (CDMA) wireless formats, Wireless Application Protocol (WAP), high bandwidth wireless protocols (e.g., EV-DO, WCDMA), or peer-to-peer protocols. The particular composition and protocol of communications channel 120 is not critical as long as it allows for communication between origin data processing system 105 and destination data processing system 125.

Destination data processing system 125 may be adapted to receive message 107' from communication channel 120. Destination data processing system 125 may be implemented as one or more computer systems including, for example, a personal computer, minicomputer, microprocessor, workstation, mainframe, or similar computing platform typically employed in the art. Additionally, destination data processing device 125 may have components typical of such computing systems including, for example, a processor, memory, and data storage devices.

Destination data processing device 125 may include one or more data processors that are physically and/or functionally isolated to provide limited access to information by systems or individuals outside the system. Even though in the exemplary embodiment of FIG. 1 destination data processing system 125 is described as being part of an insecure environment compared to origin data processing system 105, destination data processing device 125 is not necessarily open and unprotected. For the purposes of describing the exemplary embodiments herein, "insecure" refers to a destination data processing system 125 that is relatively less secure than origin data processing system 105.

In some embodiments, destination data processing system 125 may be an enterprise resource planning (ERP) system that includes a suite of integrated software applications supporting the various business or organization services, such as manufacturing, order processing, billing, accounting, materials tracking and human resources management. By way of example, destination data processing system 125 may comprise one or more of the integrated suite of software applications within SAP R/3 or mySAP, commercially available from SAP AG (Walidorf, Germany).

Consistent with the exemplary embodiment shown in FIG. 1, origin data processing system 105 may receive or generate message 107 including sensitive information. For example, origin data processing system 105 may be a command and control information system for monitoring and controlling ongoing military operations. In such cases, system 105 may process messages describing, for example, operational details that are highly-classified. However, to manage logistical details of the operation, the command and control information system (105) may need to provide messages to an enterprise resource planning system (125) having a lower security level.

Prior to transmission over insecure communications channel 120, which itself may be insecure, message 107 is provided to filter module 115 which processes the message to remove sensitive information and generate filtered message 107'. As described in more detail below, filter module 115 may receive the message 107 and remove selected sensitive data to produce a filtered message 107' including the information originally included in message 107 except for any of the selected sensitive information. For instance, where message 107 is provided in XML or similar object-oriented formats, portions of the message having sensitive information in the message may be selected based on XML tags of the different portions of the message. After message 107 is processed by filter module 115, transmission of filtered message 107' across communication channel 120 to the insecure destination data processing system 125 may be permitted. Advantageously, if information included in the filtered message 107' is intercepted or stolen after transmission, no sensitive data will be lost.

Figure 2:
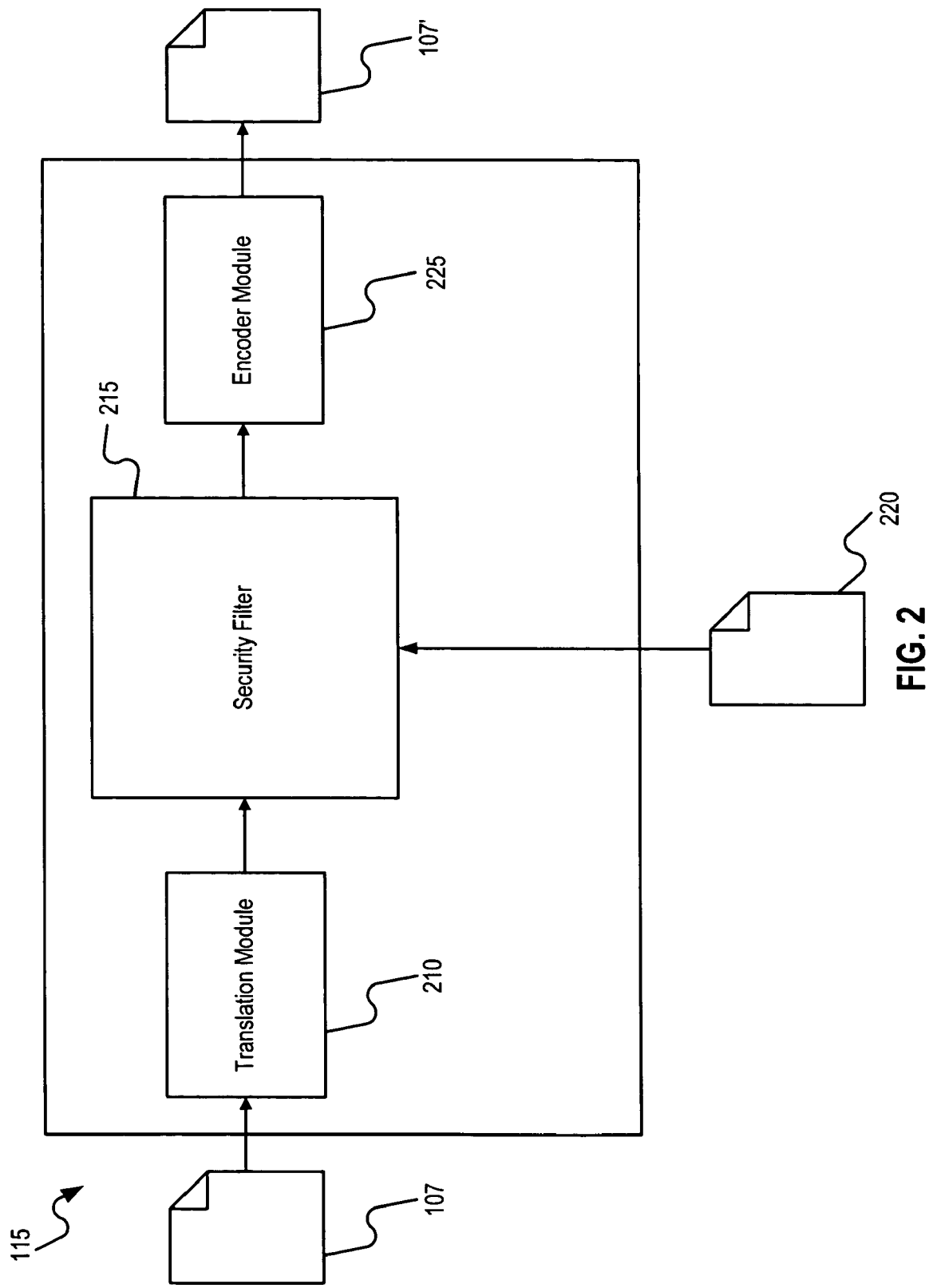
FIG. 2 is a diagram of an exemplary filter module, consistent with an embodiment of the present invention.

FIG. 2 is a diagram of an exemplary filter module 115, consistent with an embodiment of the invention. As shown in FIG. 2, filter module 115 may include a translation module 210, a security filter 215, a configuration file 220, and an encoder module 225.

Translation module 210 may comprise computer-executable instructions operable to receive message 107 encoded in a first format and translate the message into a second format compatible with security filter 215. When message 107 from origin data processing system 105 is received by filter module 115, using conventional techniques, translation module 210 may translate the message into an appropriate format. For instance, message 107 may be received from a military command and control information system encoded in a predefined format such as ADatP-3 (Allied Data Publication No. 3) or the USMTF (United States Message Text Format). These standards prescribe a message structure for encoding information in a prescribed format, order, and/or vocabulary. For example, a message communicating the location of a military unit may include several parts. Each part may included information belonging to a predefined type, such as: force type (e.g., sea, ground, or air), time, location, type of unit, quantity of units, direction and speed. Each part may also be provided in an order predefined by the message standard. Additionally or alternatively, each part may describe information using predefined vocabulary or attribute; for instance, the type of operation may be described as one of "GNDOP," "AIROP," or "SEAOP." Using a conventional parser, translation module 210 may break message 107 into its constituent parts. Then, based on each part's type, order or vocabulary, translation module may translate message 107 into a desired format, wherein some or all of the parts of the original message are mapped into different message elements including the information originally contained in each part and having tags belonging to a predefined class corresponding to type of information. For example, translation module 210 may translate a portion of a message describing a type of unit as "tank" into an XML element as "<unit_type>tank</unit_type>."

Security filter 216 may, consistent with the exemplary method shown in FIG. 4, comprise computer-executable instructions operable to receive message 107 and remove selected sensitive portions while retaining other portions in the message. Portions of message 107 to be selected as sensitive or not-sensitive may be determined based on a filter configuration file 220.

Configuration file 220 is a data file including configuration information that controls the behavior of security filter 215. Configuration file 220 may be stored in, for example, a data storage device included in origin data processing system 210. Although FIG. 2 shows only one configuration file 220, in some embodiments, one or more different configuration files 220 may be selected to provide different filter behaviors for filter module 115. For instance, a different configuration file 220 may be selected based on the security classification level of destination data processing system 125.

When processing message 107, security filter 215 may receive configuration file 220 and, based on the data included in configuration file 220, select different portions of message 107 for removal. Configuration file 220 may specifically identify classes of message information for removal or redaction by security filter 215. In some embodiments, other classes of message information may be identified for retention. For instance, in an exemplary embodiment, message is encoded or translated into XML format with tags for elements in a message, configuration file 220 may specify which element tags are to be removed, redacted, and/or retained. Furthermore, configuration file 220 may indicate different levels of filtering. If configuration file 220 identifies an aggressive level of filtering, then security filter 215 may remove all portions of a document not specifically identified as allowed. Conversely, if configuration file 220 identifies a permissive level of filtering, security filter 215 may delete or redact only message information that is in a class of message information identified for deletion in configuration file 220.

Encoder module 225 may comprise computer-executable instructions operable to convert a message processed by security filter 215 into a format appropriate for destination data processing system 125. For example, if message 107 was originally received in an ADatP-3 format and translated by translation module 210 into XML format, encoder module 225 may translate the filtered message back into an ADatP-3 format before transmitting message 107' to destination data processing system 125.

According to the embodiment of FIG. 2, filter module 115 may receive message 107. If message 107 is encoded in a format incompatible with security filter 215 (e.g., XML), as described above, translation module 210 may translate the received message into a compatible format. For instance, message 107 may be encoded in an ADatP-3 format. Using techniques know in the art, translation module 210 may translate the ADatP-3 message into an XML format by extracting information from the message and assigning portions of the data into corresponding elements having an associated tag describing the portions belonging to one or more predefined classes. However, if message 107 is already in a format compatible with security filter 215 (e.g., XML), then filter module 115 may provide message 107 directly to security filter 215 without any translation by translation module 210.

Figure 3A:
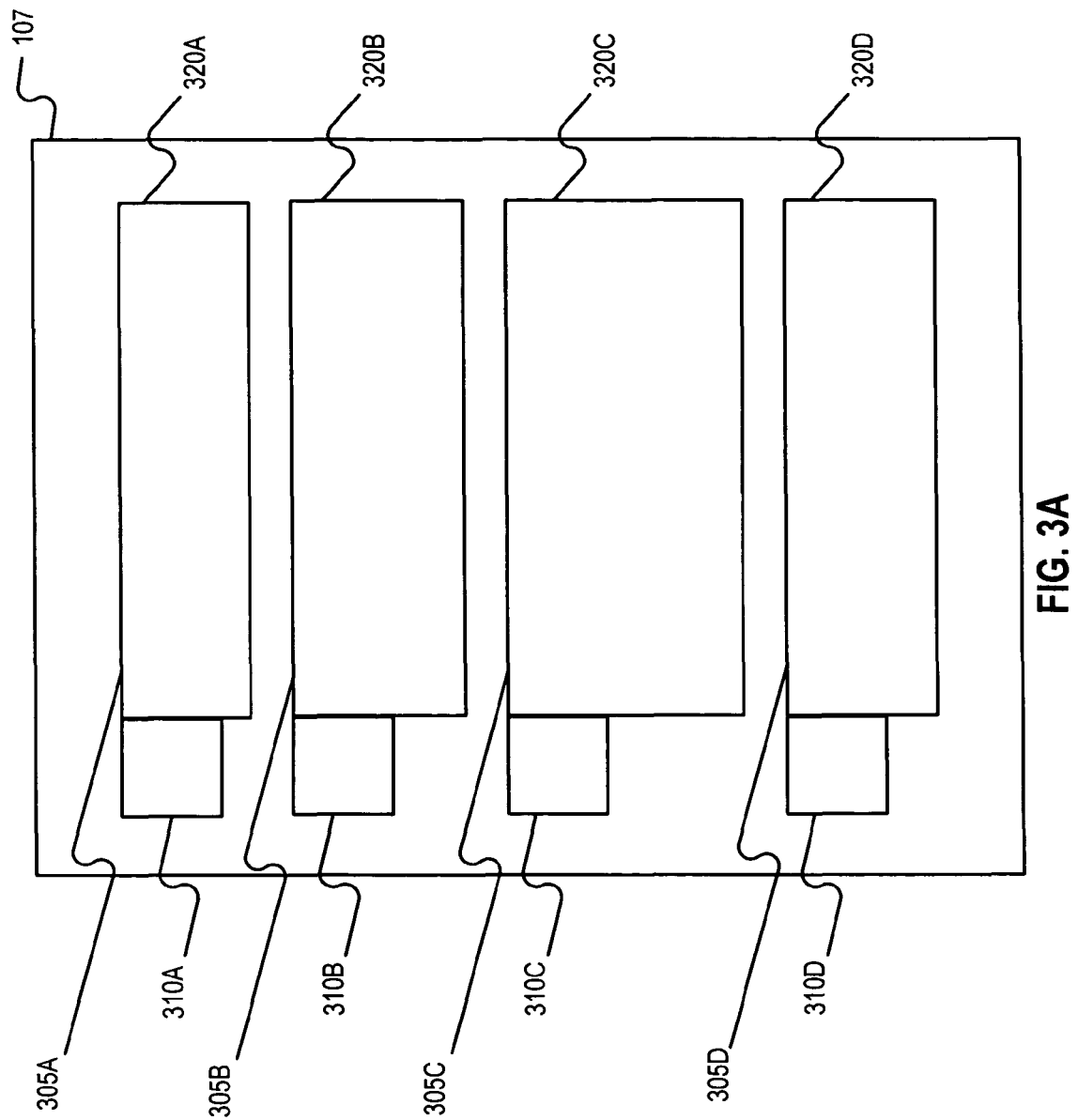
FIGS. 3A-3C are diagrams of exemplary messages, consistent with embodiments of the present invention.

FIG. 3A is a diagram of an exemplary message 107, consistent with an exemplary embodiment of the present invention. Message 107 may include a plurality of message elements 305A-305D each having tags 310 (310A, 310B, 310C, or 310D) and message information 320 (320A, 320B, 320C, or 320D). A message element 305 may be any unit of data and may further include other elements message elements 305. Although message 107 is shown in FIG. 3A as having only one level of message elements 305, message 107 may include several hierarchical levels of message elements 305, each level being individually referenced based on senior levels within the hierarchy. In some embodiments, message 107 is encoded consistent with XML standards and/or message elements 305 are referenced using the XPATH programming language.

Class tags 310A-310D are information defining a predetermined class of message information included in a data element 305. Class tags may be any text, phrase, character, number, symbol, or icon indicative of the predetermined class and may be stored within a message 107 or in an associated, external data file. By referencing class tags 310, portions of message 107 may be selected according to the class of information included in message element 305 identified by the tag 310.

Message information 320A-320D may include text, images, icons, audiovisual files, links to other files. Using class tags 310, and based on configuration file 320, security filter 215 may select message element 305 in message 107 and, in some embodiments, remove or redact the corresponding message information 320.

Figure 3B:
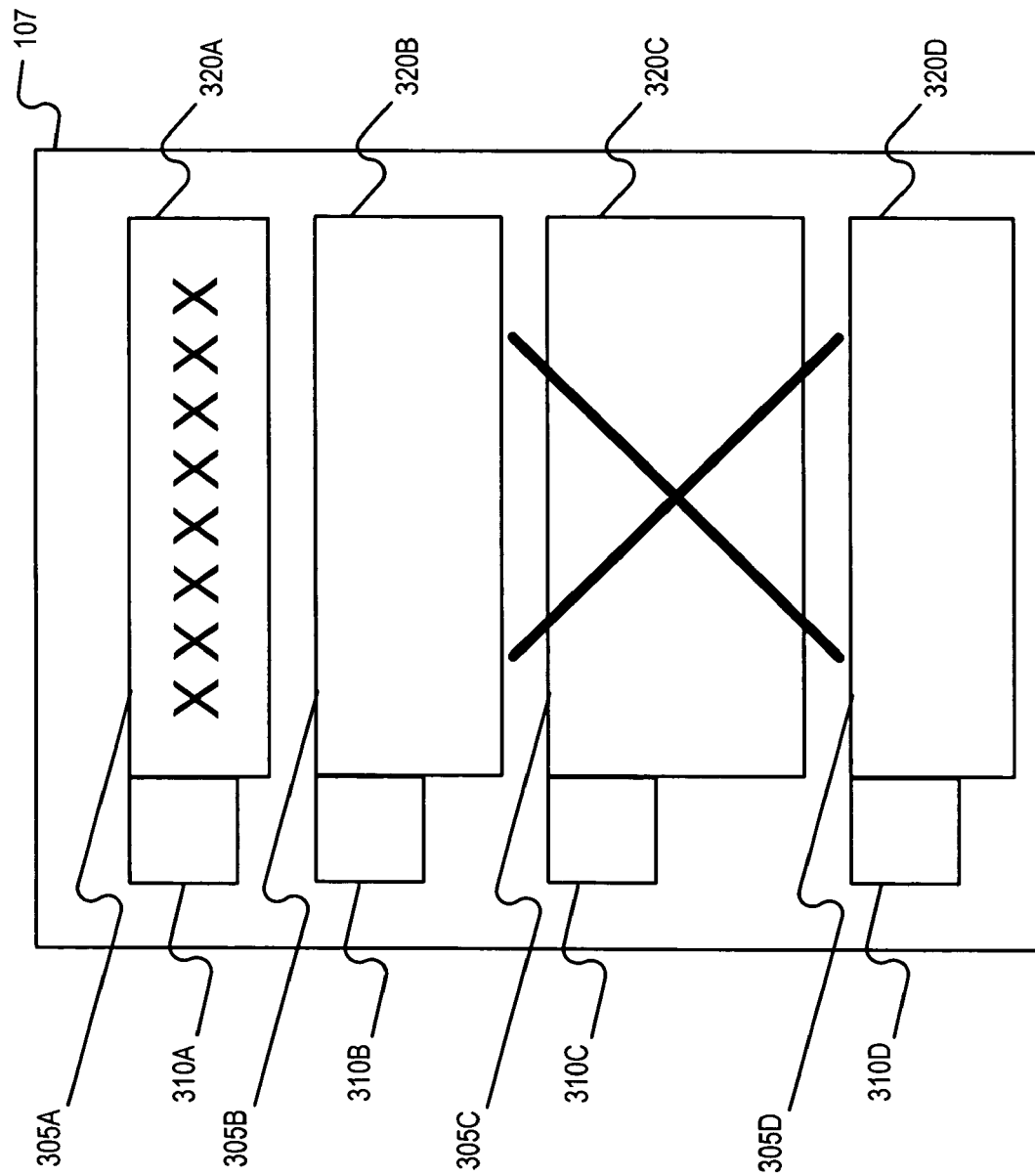

FIG. 3B illustrates the removal of message information from message 114. For instance, based on data in configuration file 220 for controlling security filter 215, one or more of the message elements 305A-305D in message 107 may be selected based on class tags 310A-310D, respectively, and the corresponding message information 320A-320D may be removed from the selected message elements 305A-305D. For instance, FIG. 3B shows message information 320A being redacted from element 305A replacing message information 320A and, optionally, with dummy information. The dummy information may be, for example, character symbols, phrases, icons, or the like. In one embodiment, when redacted, message information 107 may be replaced by, for example, dummy characters (e.g., "X") or words (e.g., "REDACTED"), or even misinformation (e.g., "John Doe"). Alternatively, FIG. 3B shows message element 305C being deleted from message 107. In some cases, security filter 215 may delete the entire message element 305C or, in other cases, security filter 215 may only delete message information 320C.

Figure 3C:
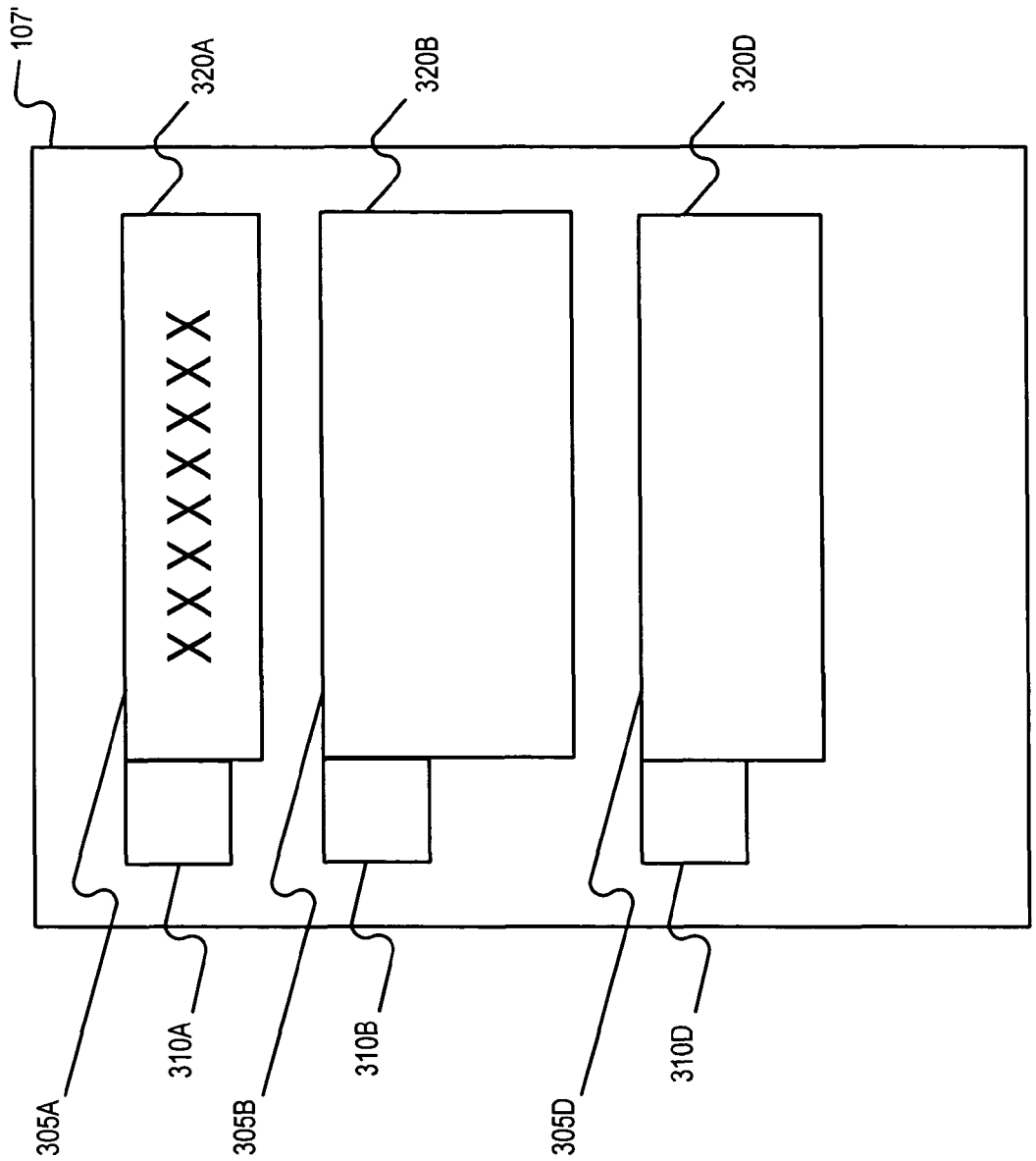

FIG. 3C shows an exemplary filtered message 107' after removal of sensitive information. In accordance with some embodiments, filter module 115 generates the filtered message 107' by removing information from the original message 107 based on information from configuration file 220. Consistent with the exemplary changes shown in FIG. 3B, FIG. 3C shows message element 305A including dummy information in place of the original message information 320A. FIG. 3C also illustrates message element 305C as having been deleted from the original message 107.

FIG. 4 illustrates an exemplary configuration file 220, consistent with an embodiment of the invention. As shown in FIG. 4, configuration file 220 may be encoded in XPATH, a language for identifying the location of elements within an XML document. Configuration file 220 may include various sections including, but not necessarily limited to: settings 410, allowed items 420, replace items 420 and delete items 430. Settings 410 may specify the general behavior of the security filter 215. For instance, "<behavior>normal</behavior>" configures security filter 215 all message elements 305 having tags 310 not specifically identified in allowed items section 420. In comparison, "<behavior>strict</behavior>" (not shown) configures security filter 215 to delete all message elements 305 having tags 310 not specifically indicated in allowed item section 420.

Further, in the example of FIG. 4, allowed item section 420 defines message elements 305 that are specifically identified for retention in filtered message 107'. Replace section 430 defines message elements 305 that are replaced by security filter 215, as specified in settings section 410. Finally, delete item section 440 indicates message elements identified for removal from message 107 by security filter 215.

By referencing configuration file 220, such as that illustrated in FIG. 4, security filter 215 may selectively remove, replace, and/or retain portions of message 107 before transmission of message 107 between secure domain 102 and insecure domain 122.

Figure 5:
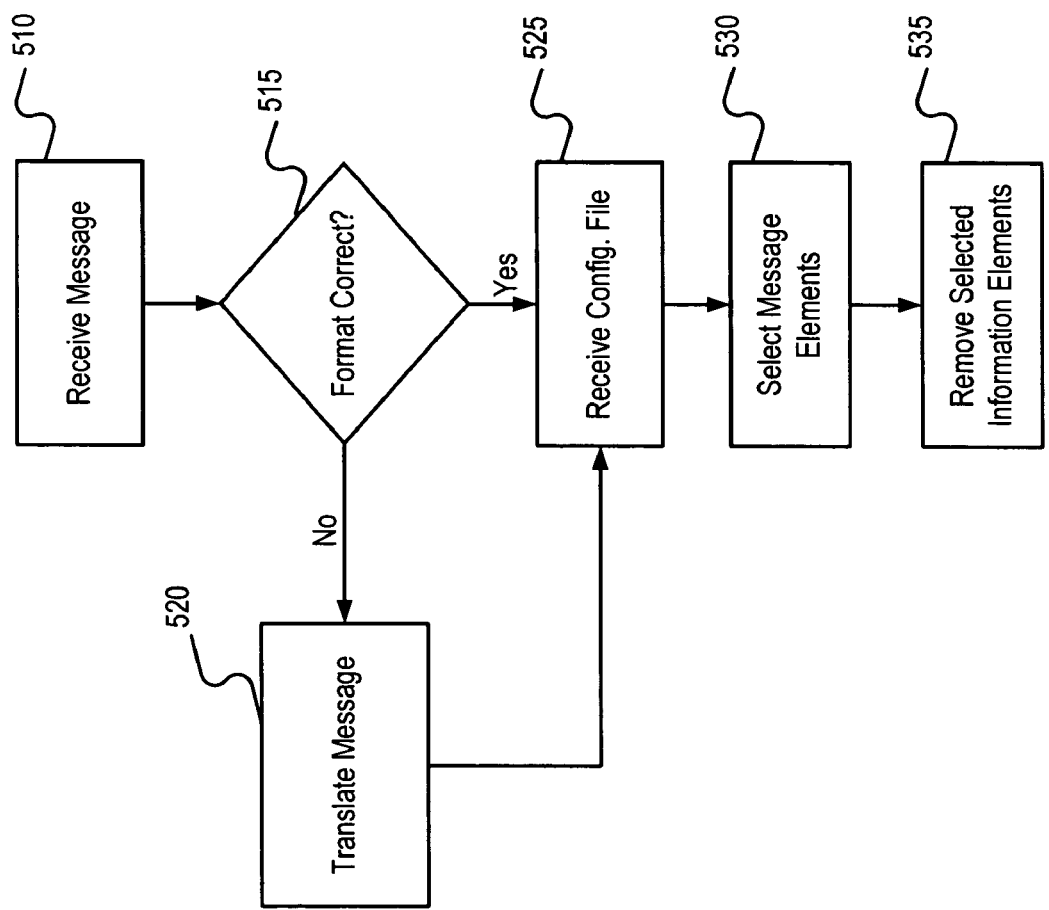
FIG. 5 is a diagram of an exemplary process for removing information from messages, consistent an embodiment of the present invention.

FIG. 5 illustrates a flow diagram of an exemplary process, consistent with the disclosed exemplary embodiments. Filter module 115 receives message 7 from origin data processing system 105, including secure or sensitive information (step 510). Filter module 115 determines whether or not message 107 is in a proper format for further processing by security filter 215 (step 515). If message 107 is not in the correct format (step 515, No), then the message is provided to translation module 210 for translation into a format compatible with security filter 215 (step 520). For instance, if message 107 is received in ADatP-3 format, translation module 210 may convert the message into XML format including, for example, a message element 305 having predefined class tag 310 describing the type of message information 320. Once message 107 is properly formatted, the message is provided to security filter 215 for processing. Otherwise, if message 107 is received in a compatible format, then the message is provided directly to security filter 215 without being translated by translation module 210 (step 515, Yes).

Filter module 115 also receives configuration file 220 for controlling the behavior of security filter 215 (step 525). Using information provided by configuration file 220, security filter 215 selects one or more message elements (305) from message 107. In some embodiments, configuration file 220 provides data identifying predefined tags of message elements 305 for removal, and security filter 215 may select message elements 305 having class tags 310 corresponding to the predefined tags identified by configuration file 220. For example, configuration file 220 may include information identifying a predefined tag of message element 305 identified for deletion.

In other embodiments, configuration file 220 provides tags identifying predefined classes of message elements 305 for removal, as well as a data identifying a behavior of security filter 215. For example, based on data obtained from configuration file 220, security filter 215 may select any message elements 305 in original message 107 identified by a class tag 310 as belonging to the class <secret_msg_info> for removal from message 107, as well as identifying message elements, such as <sender> for retention in source message. If the behavior data indicates aggressive filtering (i.e., "paranoid"), security filter 215 selects all message elements 305 that are not identified by configuration file 220 for retention. Conversely, if behavior data indicates permissive filtering (i.e., "trusting"), security filter 215 selects only message elements 305 identified by configuration file 220 for removal.

After security filter 215 has selected message elements in accordance with step 530 above, security filter 215 removes selected message elements 305 from message 107 (step 535). In some embodiments, based on information received in configuration file 220, message information 320 is removed by either deleting message information 320 from a message element 205 or, message information 320 is removed by deleting message element 305 from message 107. Alternatively, in some embodiments, based on information received in configuration file 220, message information 320 is removed by replacing message information 320 in a selected messaged element 305 with dummy information. Dummy information may simply be a repeating character (e.g., XXXXXXX), a word or a phrase (e.g., "REDACTED" or "This Information Intentionally Removed), or misinformation, such as different names, dates, locations corresponding to the removed message element 305.

After security filter 215 removes selected message elements 305 from message 107, the filtered message 107' may be provided for communication. Filter module 115 may determine whether filtered message 107 is in an appropriate format (step not shown in FIG. 5), and, if not encoder module 225 translates the filtered message 107' to the correct format. For example, encoder module 225 may, based on the original format of message 107, translate filtered message 107' into the original format of message 107.

Once translated by encoder module 225, filter module 115 may provide filtered message 107' for transmission to destination data processing system 125. Otherwise, if filter module 115 determines that filtered message is in a proper format, filter module 115 may provide filtered message 107 for transmission to destination data processing system 125. Since filter module 115 removes sensitive information, filtered message 107' may be safely transmitted over communication channel 120 to destination data processing system 125 and/or using insecure media.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and flow charts of this invention are within the skill of an experienced developer and/or programmer. The various programs or program content can be created using any of the techniques known to one skilled in the art or can be designed in connection with existing software. For example, programs or program content can be designed in or by means of Java, C++, HTML, XML, or HTML with included Java applets or in SAP R/3 ABAP. One or more of such content can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

As disclosed herein, embodiments and features of the invention may be implemented through computer-hardware and/or software. Such embodiments may be implemented in various environments, such as networked and computing-based environments with one or more users. The present invention, however, is not limited to such examples, and embodiments of the invention may be implemented with other platforms and in other environments.

By way of example, embodiments of the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and databases referred to herein symbolize elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implement features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is therefore intended that the specification and examples be considered as exemplary only, with a true scope and spirit of the invention being indicated by the following claims.

What is claimed is:

1. A method for filtering a message comprising:
receiving the message including a plurality of information elements, at least one of the plurality of information elements having message information and belonging to at least one of a plurality of predefined classes of information elements;
receiving security data related to a destination;
selecting a configuration file based on the security data related to the destination, the configuration file comprising a settings section for indicating a behavior of filtering the message, and at least one section including a target class corresponding to the behavior of filtering;
using the selected configuration file to select, by a processor, at least one of the plurality of information elements belonging to a predefined class corresponding to the target class, the target class including classes of information elements selected for filtering; and
filtering, by the processor, any message information in the message corresponding to the selected information elements to provide a filtered message for transmission to the destination.

2. The method of claim 1, wherein the the setting section comprises configuration data specifying the target class, and further wherein the using the selected configuration file to select at least one information element comprises selecting information elements included in the target class specified in the configuration data.

3. The method of claim 1, wherein the configuration file comprises configuration data specifying the target class and a non-target class, the non-target class including at least one of the plurality of predefined classes of information elements, and further wherein the using the selected configuration to select at least one information element comprises selecting only the information elements included in the target class.

4. The method of claim 1, wherein the configuration file comprises configuration data specifying the target class and at least one non-target class, the non-target class including at least one of the plurality of predefined classes of information elements, and further wherein the using the selected configuration to select at least one information element comprises selecting all information elements except the information elements included in the at least one non-target class.

5. The method of claim 1, wherein the predefined class corresponds to a security classification of an information element.

6. The method of claim 1, wherein filtering the message information comprises deleting the message information.

7. The method of claim 1, wherein filtering the message information comprises deleting the selected information element.

8. The method of claim 1, wherein filtering the message information comprises replacing the information with dummy information.

9. The method of claim 1, wherein the predefined classes are indicated by extensible markup language tags.

10. A system for protecting sensitive data in a message, comprising:
a processor; and
a program stored in a computer-readable medium and when executed by the processor, operable to:
receive a message including a plurality of information elements, at least one of the plurality of information elements having message information and belonging to at least one of a plurality of predefined classes of information elements,
receive security data related to a destination;
select a configuration file based on the security data related to the destination, the configuration file comprising a settings section for indicating a behavior of filtering the message, and at least one section including a target class corresponding to the behavior of filtering;
select, based on the selected configuration file, at least one of the plurality of information elements belonging to a predefined class corresponding to the target class, the target class including classes of information elements selected for filter, and
filter any message information corresponding to the selected information elements to protect sensitive data in the original message.

11. The system of claim 10, wherein the setting section comprises configuration data specifying the target class, and the program is further operable to select information elements included in the target class.

12. The system of claim 10, wherein the setting section comprises configuration data specifying the target class and a non-target class, the non-target class including at least one of the plurality of predefined classes of information elements, and the program is further operable to select only the information elements included in the target class.

13. The system of claim 10, wherein the setting section comprises configuration data specifying the target class and at least one non-target class, the non-target class including at least one of the plurality of predefined classes of information elements, and the program is further operable to select all information elements except the information elements included in the at least one non-target class.

14. The system of claim 10, wherein the predefined class corresponds to a security classification of an information element.

15. The system of claim 10, wherein the program is operable to delete the message information.

16. The system of claim 10, wherein the program is operable to delete the selected information element.

17. The system of claim 10, wherein the program is operable to replace the information with dummy information.

18. The system of claim 10, wherein the predefined classes are indicated by extensible markup language tags.

19. A method for removing confidential information from a message, comprising:
receiving a confidential message including a plurality of information elements, at least one of the plurality of information elements having message information and belonging to at least one of a plurality of predefined classes of information elements;
receiving security data related to a destination;
selecting a configuration file based on the security data related to the destination, the configuration file comprising a first section indicating a class of information elements for removal from the message and a second section indicating a class of information elements for retention in the message, the class of information elements for removal comprises at least one of the plurality of predefined classes and includes confidential message information, and the class of information elements for retention comprises at least another of the plurality of predefined classes;

using the selected configuration file to select, by a processor, information elements belonging to the class indicated for removal; and removing, by the processor, any message information corresponding to the selected information elements.

20. The method of claim 19, wherein the message is encoded in extensible markup language format.

* * * * *